Oct. 24, 1939.　　　H. G. A. AKERLIND　　　2,177,087
PATTERN GRADING MACHINE
Filed June 18, 1937　　　5 Sheets-Sheet 1

Inventor
Hilmer G. A. Åkerlind
By Sommers & Young
Attys

Oct. 24, 1939.  H. G. A. AKERLIND  2,177,087
PATTERN GRADING MACHINE
Filed June 18, 1937  5 Sheets-Sheet 2
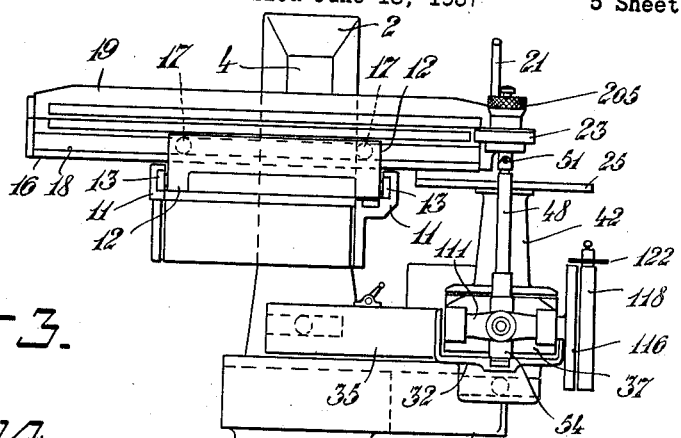
Fig. 3.
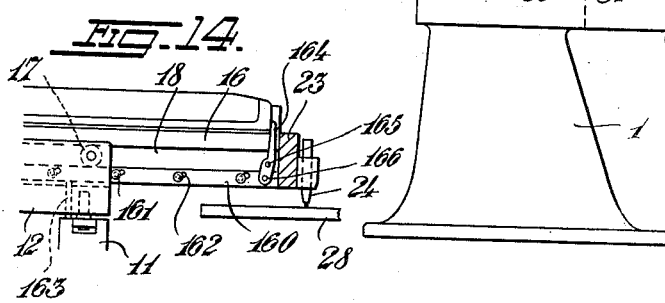
Fig. 14.
Fig. 15.
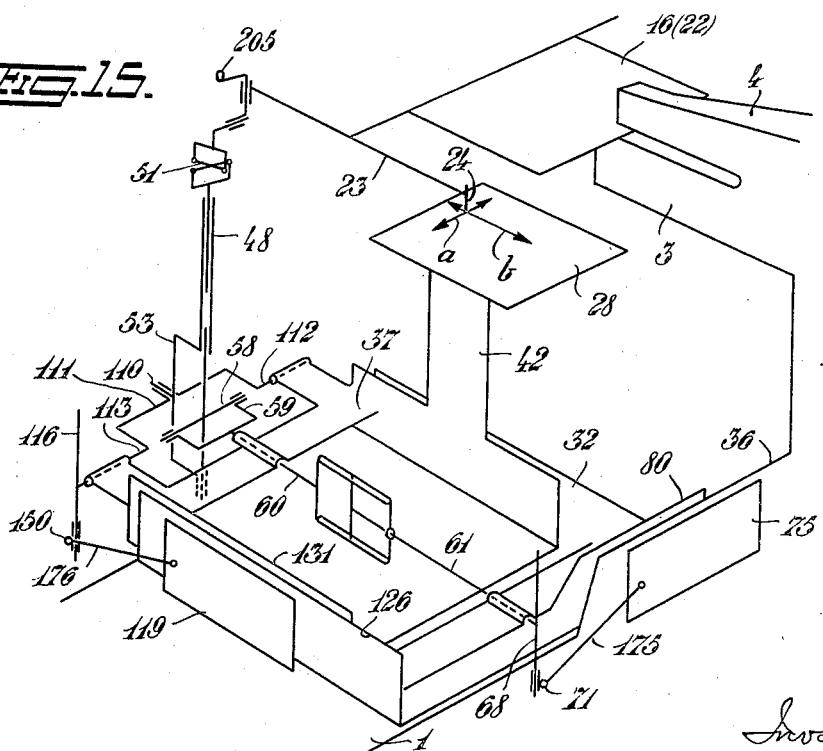
Inventor
Hilmer G. A. Åkerlind
By Sommers & Young
Attys Oct. 24, 1939.  H. G. A. AKERLIND  2,177,087
PATTERN GRADING MACHINE
Filed June 18, 1937  5 Sheets-Sheet 3
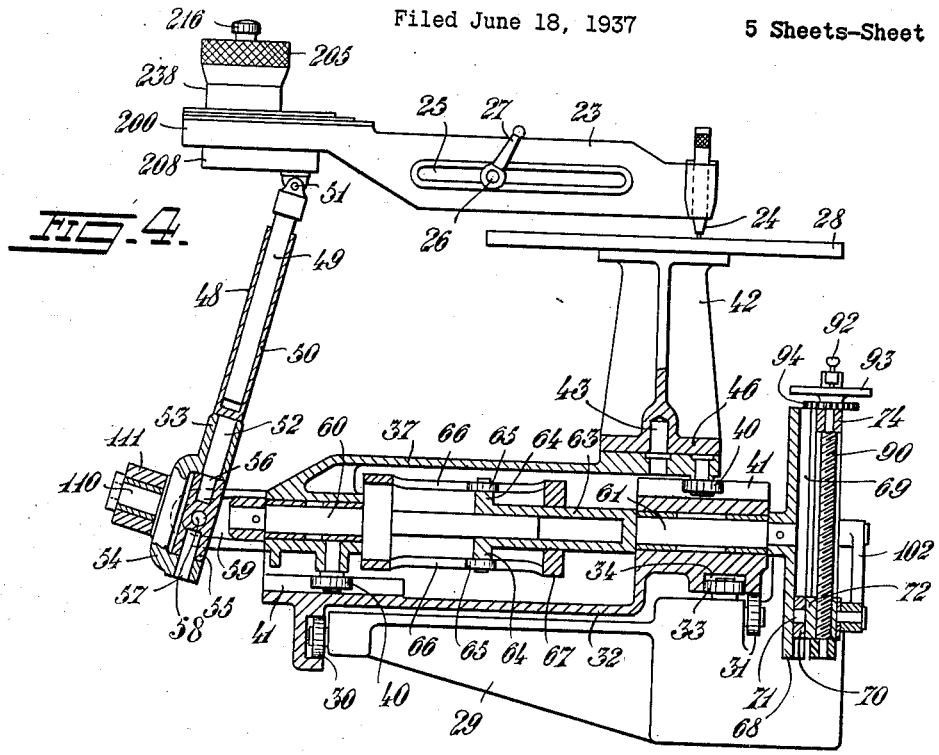
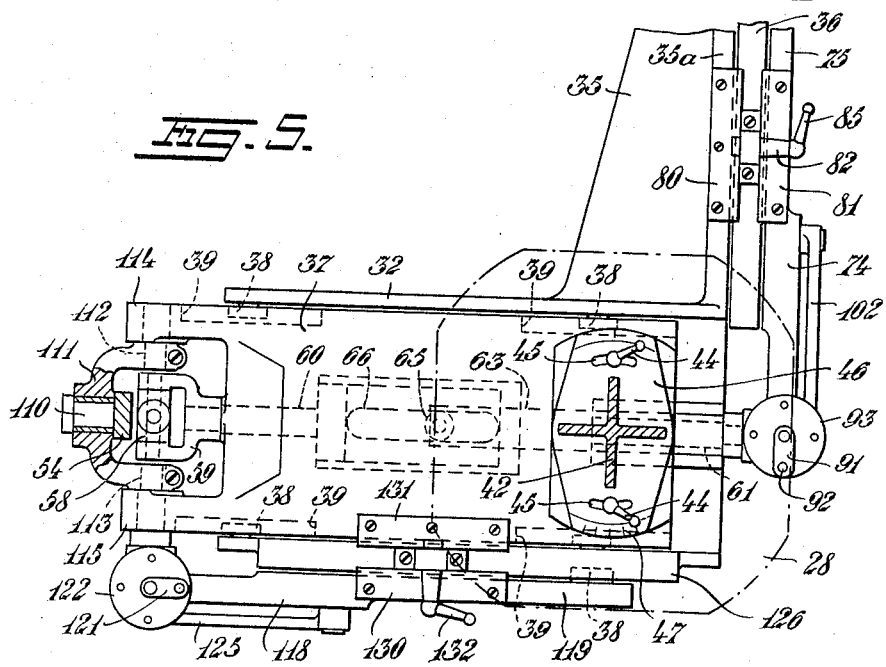
Inventor
Hilmer G. A. Åkerlind
By Sommers & Young
Attys Oct. 24, 1939.   H. G. A. ÅKERLIND   2,177,087
PATTERN GRADING MACHINE
Filed June 18, 1937   5 Sheets-Sheet 4
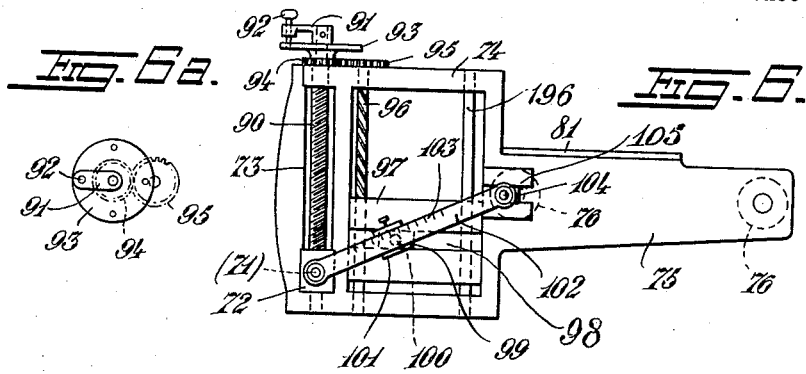
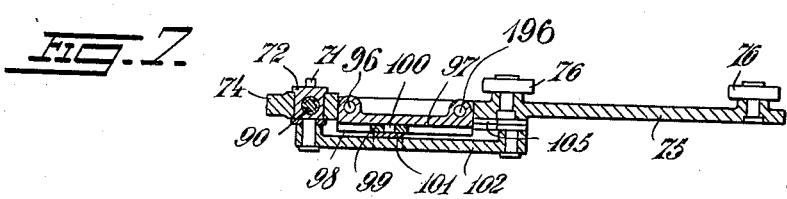
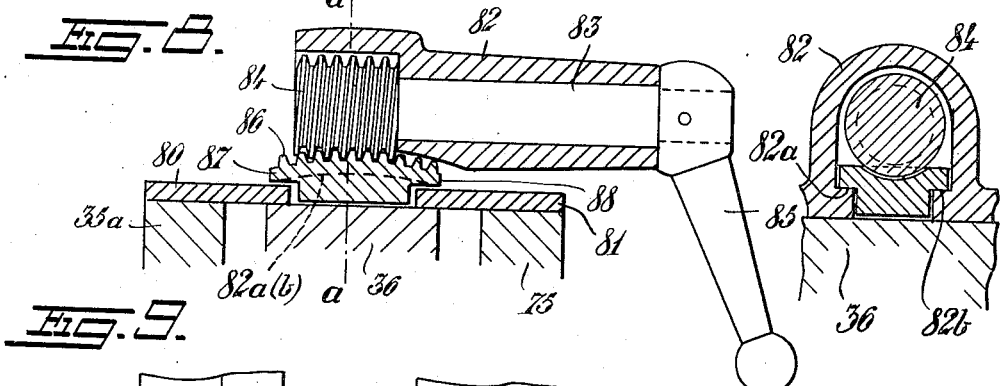
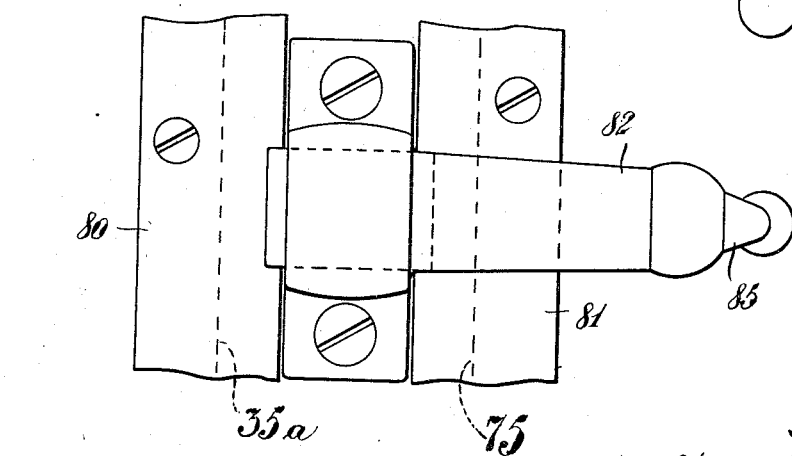
Inventor
Hilmer G. A. Åkerlind
By Sommers & Young
Attys Oct. 24, 1939.   H. G. A. AKERLIND   2,177,087
PATTERN GRADING MACHINE
Filed June 18, 1937   5 Sheets-Sheet 5
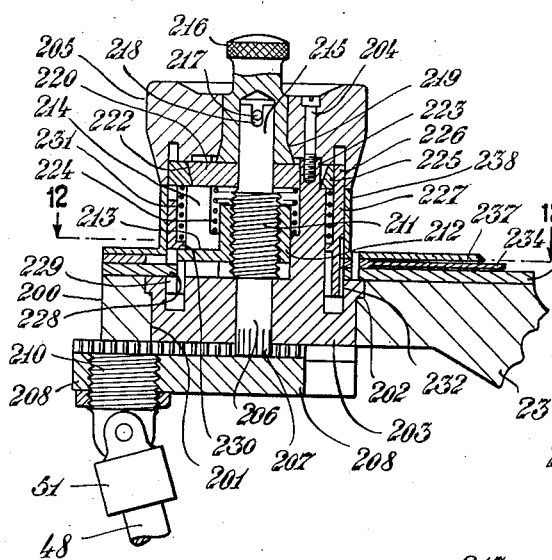
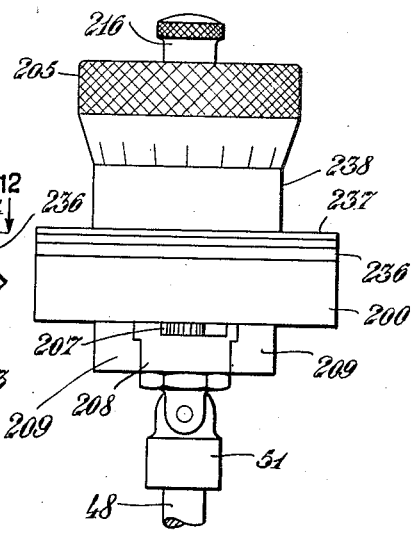
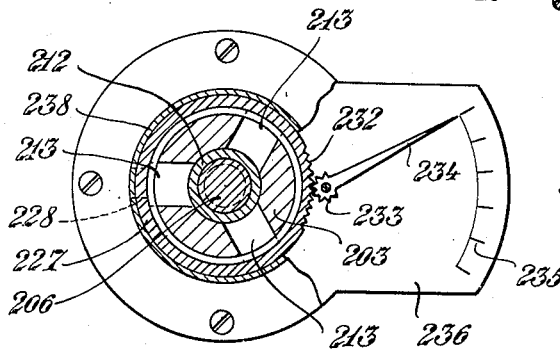
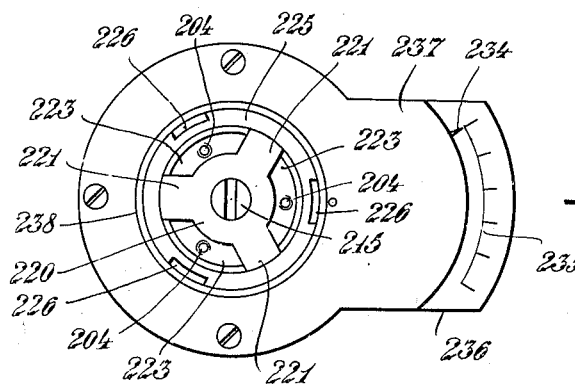

Patented Oct. 24, 1939

2,177,087

UNITED STATES PATENT OFFICE 2,177,087

PATTERN GRADING MACHINE

Hilmer Gustaf Adolf Åkerlind, St. Essingen, near Stockholm, Sweden

Application June 18, 1937, Serial No. 149,030

20 Claims. (Cl. 164—48)

This invention relates to pattern grading machines, that is, machines for reproducing a model in a work piece, and more particularly to pattern grading machines of the "two-dimensional" kind for producing series of magnified or reduced patterns from a model.

Machines of this type comprise four primary instrumentalities, namely, a model holder, a work holder, a model follower, and a cutting tool, interconnected by two pantographs acting to magnify or reduce the length and width of the model relatively to length and width grading axes, independently in the work piece.

In addition to these primary instrumentalities, machines of the above said type are provided with manually controlled means, generally termed "correcting mechanism", for causing a relative movement to take place between two of said primary instrumentalities, for effecting grade restrictions.

Furthermore, machines of this type should be so designed as to allow an adjustment whereby, during a grading operation, the grade factor may be changed at predetermined points while working along a certain edge of the work. Such a method of grading is usually called "center grading".

It is also known in connection with machines of the type above mentioned to provide means whereby at any time during a grading operation, the pantograph mechanism may be rendered inoperative, thereby causing the machine to grade at a 1:1 ratio irrespective of the actual settings of the grading mechanism.

The present invention has for its object to provide a pattern grading machine which is capable of dealing with the grading operations above referred to and which is so constructed and designed as to allow all adjustments to be performed easily and quickly without the operator being compelled to move around the machine. To this end the correcting mechanisms, of which there are two as a rule, are combined to form a single unit situated at a point near the operator's place by which restriction may be made in any direction desired. Another feature resides in the provision of means whereby at any point of a pattern under grading the machine can be set by two simple manipulations, one for each pantograph, to grade at a 1:1 ratio.

It is also an object of the invention to allow the grading factor to be changed to any value within the possible range of the machine by a minimum of manipulations. The pantographs are well positioned for effecting the adjustments and are so constructed that no additional scales need be inserted. In effecting the adjustments for grading successive sizes, no careful adjustments along scale graduations need take place, the adjusting devices being so constructed as to present determined positions of engagement.

A special advantage of the machine according to the invention resides in its great surveyability. There are no connecting members above the model table except the stylus arm, so that the operator from his place in front of the machine while moving the model follower therearound can observe both the model and the cutting operation.

In order to obtain these and other advantages of the invention, the pantographs instead of being positioned in a horizontal plane as hitherto commonly used in connection with pattern grading machines, are arranged vertically below and to the sides of the model holder.

The machine is provided with a stationary primary instrumentality, namely the cutting tool. Two of the other primary instrumentalities, viz., the model follower and the work holder, are normally fixed but adjustable with relation to each other, and both of them are movable in all directions by being mounted on a slide movable in two perpendicular directions. The remaining, or fourth, primary instrumentality, that is, the model holder, is similarly movable in all directions.

By the action of the two pantographs there may be imparted to the model holder a relative movement in the same direction as or in the opposite direction to the manually controlled model follower and work holder. In this way the magnification or reduction of the size of the work piece with respect to that of the model will be obtained. The transmission of the primary movement of the model follower and work holder is effected by means of a common member, connected at its upper end to said primary instrumentalities by a universal joint and connected at its lower end in a way to be hereinafter explained to horizontally positioned perpendicular fulcrums of the two pantographs.

The arrangement above set forth, in addition to its solving in a correct manner the, by no means easy, problem of transmitting motion between the slides carrying the model follower and the work and the slides carrying the model holder, also renders it possible to concentrate, without the aid of Bowden wires or the like, the correcting mechanisms for both pantographs to a common point.

The correcting operation as referred to in this description involves that the end of the pantographs connected to primary instrumentalities is displaced with respect thereto. Owing to the fact that in the illustrated machine said end is common to both pantographs, the corrections as far as both pantographs are concerned may be controlled by a single adjusting member. The correcting mechanism comprises, essentially, an adjustable and rotatable slide to which the already mentioned universal joint is connected. This mechanism permits the correction to take place in any direction. The radial adjustment of the universal joint with respect to the axis of rotation of said slide will indicate the extent of the correction and the angular position of the universal joint will indicate the position of the correction with respect to the east and west and north and south directions of the machine.

The member common to both of the pantographs is coupled at its lower end to the slide movable in all directions which supports the model holder. By virtue of this arrangement the adjusting devices for the pantographs will remain stationary with relation to the respective direction of movement while the grading operation is being done. Another advantage inherent to this construction involves that the scales of the adjusting members will become continuous altogether and may be formed accordingly. In spite of this fact, the common member above referred to may be coupled to a fixed point in which case the primary movement will be transmitted to the model holder by way of the adjusting members which for this reason are released so that they can move freely.

In the illustrated machine the members for effecting the adjustment of the pantographs are made movable for reasons which have to do with the center grading operation above referred to and which will be hereinafter more fully explained. In effecting regular grading they are, however, locked against independent movement. For the same reasons the machine is provided with means for locking the slide that supports the model holder. These locking means are so positioned and so designed as to alternately lock the slide or the pantograph adjusting device. In this way a quick and easy change from regular grading to grading at a 1:1 ratio may take place.

In effecting certain kinds of center grading operation it is desired to lock the slide supporting the work holder and the model follower against movement. To this end means are provided whereby said slide may be locked against movement in both directions by a single manipulation.

In order to permit the sheet of pattern board from which the pattern is being cut to be utilized in the best way possible, the member supporting the model follower and the correcting mechanism is adjustable with relation to the respective supporting slide.

These and other features of the invention will be apparent from the following description of a preferred embodiment of the invention shown in the drawings, in which Fig. 1 is a front elevation of the entire machine;

Fig. 3 is an end view looking from the left of Fig. 1;

Fig. 4 is an enlarged front elevation, partly in section, of the model follower, the model carrier and the mechanism interconnecting them;

Fig. 5 is a plan view of the mechanism shown in Fig. 4;

Fig. 6 is an enlarged front elevation of a pantograph adjusting device;

Fig. 6a is a plan view of certain details shown in Fig. 6;

Fig. 7 is a horizontal section of the device shown in Fig. 6;

Fig. 8 is a vertical section, to an enlarged scale, of a slide locking device;

Fig. 8a is a section on the line a—a of Fig. 8;

Fig. 9 is a plan view of the device shown in Fig. 8;

Fig. 10 is a vertical section of the correcting mechanism;

Fig. 11 is an end view, looking from the left of Fig. 10;

Fig. 12 is a section on the line 12—12 of Fig. 10;

Fig. 13 is a plan view of the device shown in Fig. 10;

Fig. 14 is a device for locking the work holder and model follower against movement with relation to the frame;

Fig. 15 is a diagram illustrating the action and general construction of the machine.

Figure 2:
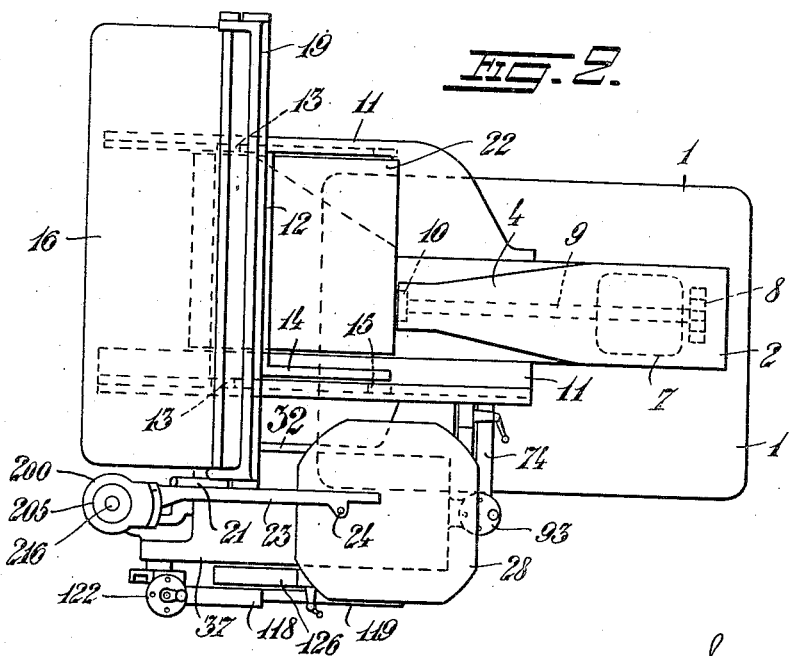
Fig. 2 is a plan view.

The illustrated machine has a main frame consisting of a vertical column 1 and a head piece 2 supported thereby. The head piece comprises a lower arm 3 situated directly on the top of the column 1 which extends toward the left of the machine, and an upper arm 4 overlying the arm 3 and extending parallel with it. This direction will hereinafter be referred to as the "east and west" direction, whereas the perpendicular direction will be called the "north and south" direction. The upper arm 4 carries at its left-hand free end a vertically reciprocable punch 5 which cooperates with a fixed die-block 6, mounted in the left-hand free end of the lower arm 3. The punch 5 is operated to cut out the pattern by power derived from an electric motor 7 situated in the head piece 2 and connected, by a belt gear 8 or the like, to a horizontal shaft 9 which is mounted in the upper arm 4 and carries at its left-hand end an eccentric or the like 10, Fig. 2, for moving the punch up and down.

Guideways 11 secured to opposite sides of the lower arm 3 of the head piece 2 extend horizontally toward the left from said arm, that is, in the east and west direction, and a carriage 12 is mounted to slide on rollers 13 along these guideways. The carriage 12 has an arm 14 projecting to the right therefrom parallel with the front guideway 11 and said arm carries a roller 15 in engagement with this guideway to prevent tilting of the carriage 12 about the rollers 13. A pattern board carrier 16 is mounted to move on the carriage 12 at right angles to the guideways 11, i. e., north and south. To this end the carriage 12 is provided on either side with rollers 17 engaging horizontal guideways 18 formed in the pattern board carrier 16. The carrier 16 extends for a considerable distance on either side of the guideways 11 so that it can move a rather long distance north and south with relation to the carriage 12 and is capable of supporting large sheets of pattern board. The carrier 16 is shown in the drawings as an unperforated plate but it may take another shape, if desired, as for instance, the shape of a skeleton frame. The pattern board carrier 16 is provided with a device for clamping a sheet of pattern board from which the pattern is to be cut. Said clamping device comprises, for instance, a beam 19 hinged on horizontal pivots 20 to ears upstanding from the carrier 16 at the front and rear edges thereof so as to support the beam in a north and south direction. It may be forced down to clamp a sheet of pattern board resting on the carrier by means of eccentrics mounted in westwardly extending projections of the beam and controlled by a handle 21 in a manner well-known per se. 22 indicates an open topped box to catch the waste material resulting from the cutting operation. Attached to the pattern board carrier 16 at the south edge thereof is a horizontal arm 23 running east and west which serves as a carrier for the model follower. The latter comprises a guide pin 24 depending from the right-hand free end of said arm 23. In order to allow the pattern board to be utilized in the best way and for other purposes, the arm 23 is adjustably connected to the pattern board carrier. To this end the arm 23 is formed with a horizontal slot 25 engaged by a pin 26 which is attached to the carrier 16 and carries, on the south side of the arm 23, a clamping nut operated by a handle 27.

As will be clear from the above description one of the primary instrumentalities of the machine, namely the cutting tool, is in a fixed position relatively to the frame of the machine, whereas two of the other primary instrumentalities, viz., the model follower and the pattern board carrier, are arranged to move as a unit, though they may be adjusted to different relative positions, as already mentioned. The remaining, or fourth, primary instrumentality, that is the model holder, is mounted to move with relation to the model follower for the purpose of effecting the magnication or reduction of the pattern with relation to the model, as already stated. The model holder is shown at 28 in the drawings. It is situated beneath the guide pin 24 and is mounted to move in all planar directions by being carried on a slide movable in one direction on another slide movable in the perpendicular direction, said two slides being connected to the combined pattern board carrier and model follower by two pantographs as will now be described. By these pantographs every movement of the guide pin 24 will, normally, cause a movement of the model holder 28 with respect to the model follower either in the same direction as the guide pin or in the reverse direction thereby increasing or decreasing the actual movement of the guide pin and the pattern board carrier with respect to the stationary machine frame, and consequently, also with respect to the punching device, according as it is desired to produce a larger pattern than that of the model or vice versa.

Figure 1:
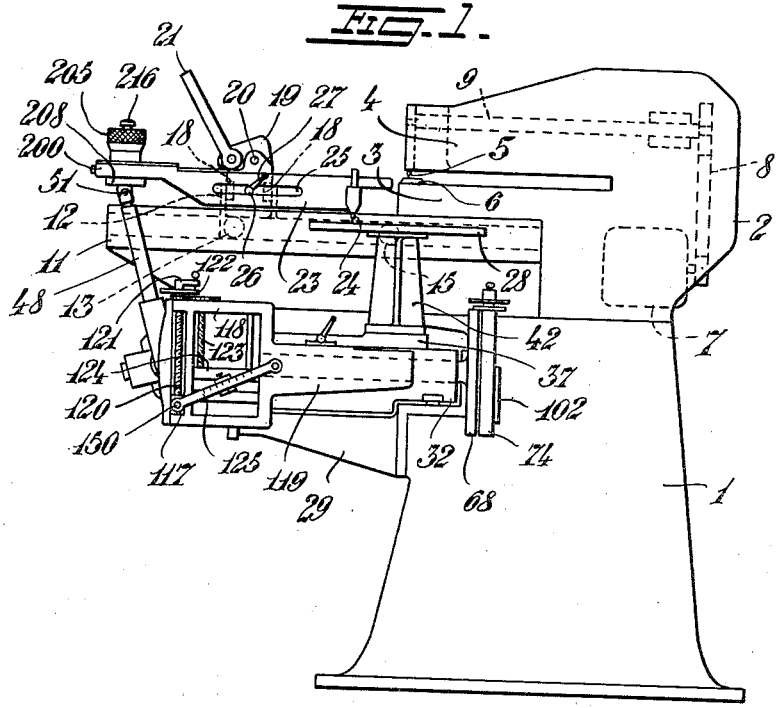

Secured to the column 1 is a horizontal bracket 29 comprising two arms at right angles to each other, one extending forwardly from the column, as shown in Fig. 3, and the other arm extending toward the left from the front end of the said first-mentioned arm, as shown in Fig. 1. Hereinafter, said arms will be referred to as the "north and south" and the "east and west" arm, respectively. The east and west arm of the bracket 29 carries, by rollers 30, 31 (Fig. 4), a horizontal slide 32, hereinafter termed the "length slide", which is mounted to move north and south thereon. Other rollers 33 mounted on vertical pivots on the upper face of said arm of the bracket 29, engage a guideway 34 formed in the under side of the length slide to eliminate side play between the bracket and said slide. The length slide is provided with a projection 35 which extends rearwardly from the slide near the east end thereof along the inner side of a rib 36 upstanding from the north and south arm of the bracket 29.

The length slide 32 supports in its turn a slide 37, hereinafter termed the "width slide", which is free to move in the east and west direction on rollers 38 along guideways 39 formed in the length slide 32. Rollers 40 mounted in the width slide 37, on vertical pivots, engage guideways 41 formed in the length slide 32 to eliminate side play between the two slides. The width slide 37 supports the model holder 28 by means of a standard 42 which is connected to the width slide by a vertical pivot 43 to permit angular adjustment of the model holder about a central vertical axis. By means of clamping screws 44 extending through curved slots 45 formed in the base plate 46 of the standard 42, the model holder may be fixed in any desired position within limits determined by the extension of the slots 45. The base plate 46 is provided with an arcuate scale 47 (Fig. 5) to indicate the angular position of the model holder.

It will be clear from the above description that the length slide 32 can only move in a north and south direction, whereas the width slide together with the model holder, while constrained to partake of the movement of the length slide, can also move east and west with relation to the length slide, thereby rendering the model holder movable in all planar directions.

The slides 32 and 37 are connected to the arm 23 carrying the model follower 24 by two pantographs, one for each slide. The two pantographs have a common member, namely a link indicated as a whole by the reference numeral 48, by which they are connected to the guide pin arm 23. In its actual structure the link 48 comprises a rod 49 and a sleeve 50 slidably engaged by said rod to enable the link as a whole to change its length automatically. The rod 49 is connected by a universal joint 51 to the guide pin arm 23 and the sleeve 50 is connected in a way to be hereinafter described to the length slide and the width slide to operate these slides independently.

The sleeve 50 engages at its lower end by a pin 52 a sleeve 53 upstanding from a strap 54 which encloses a block 55 and is connected thereto by two pins 56 and 57 lying on the same axis as the sleeve 50 and the pin 52. Preferably, the pin 56 may be a reduced extension of the pin 52. By this connection the block 55 is constrained to partake of all movements of the strap 54 and the link 48. The block 55 carries a horizontal pin 58 extending therethrough in a north and south direction. Pivoted on the ends of the pin 58 is a fork 59, the shank of which is secured to a horizontal shaft 60 rotatably mounted in the width slide 37 and extending in an east and west direction. The shaft 60 is connected to another shaft 61 lying in alinement therewith which is rotatably mounted in the length slide 32 and, for the purpose of allowing the width slide to move with relation to the length slide, the shafts 60 and 61 are so connected that they can slide with relation to each other. To this end the shaft 60 is formed with a central projection 62 engaging a sleeve-shaped projection 63 of the shaft 61. For preventing mutual rotation of the shafts 60 and 61, the sleeve 63 is formed with radial arms 64 which carry rollers 65 in engagement with longitudinal slots 66 formed in a cylindrical structure 67 attached to the shaft 60. The connecting device between the shafts 60 and 61 thus described is contained in a substantially closed space formed between the slides 32 and 37. Secured to the end of shaft 61 remote from the shaft 60 is a radial arm 68 extending on either side of the shaft 61 in such a direction that the link 48, the shafts 60, 61 and the arm 68 lie in the same plane, that is to say, the link 48 and the arm 68 are parallel with each other looking in the direction of the shafts 60, 61. The arm 68 and the link 48 represent, in combination, the length pantograph, though in this description the arm 68 only will be referred to as the "length pantograph lever". The arm 68 is formed with a longitudinal slot 69 engaged by a sliding block 70. This block is connected by a pivot 71 to another block 72 mounted to slide up and down in a vertical guideway 73 formed in a frame-like portion 74 of an adjusting slide 75, shown in Figs. 6 and 7. The slide 75 is mounted to move on rollers 76 along horizontal guideways formed in the north and south arm of the bracket 29 on the outer side of the rib 36. The shaft structure 60, 61 represents the center of the length pantograph lever by which it is connected to the length slide and the pivot pin 71 represents the adjustable fulcrum of the length pantograph lever.

The means for effecting the adjustment of the length pantograph center 71 in order to change the length grading factor comprises a vertical screw 90 rotatably mounted in the frame 74 and engaging a threaded boring in the sliding block 72. At its upper end, above the frame 74, the screw 90 carries a handle 91 by which the screw may be rotated. A locking pin 92 is situated in the free end of the handle 91, and this locking pin can be brought into engagement with any of a number of holes formed in a disc 93 loosely surrounding the unthreaded stem of the screw 90 immediately below the handle 91. The disc 93 is rigidly connected to a pinion 94 meshing in a toothed wheel 95 secured to the upper end of another screw 96 which is mounted in the frame 74 and extends parallel to the screw 90. The pitch of the screw 96 is considerably greater than that of the screw 90 and, as a matter of fact, it is so great that the screw 96 will not be self stopping. The screw 96 engages a threaded boring in a slide 97 mounted to move vertically in the frame 74 while guided by the screw 96 and a rod 196 parallel therewith. The slide 97 is formed with a horizontal guideway 98 and a block 99 is mounted to slide along this guideway. The block 99 is pivoted by the pin 100 to a slide 101 carried by a bar 102 and mounted to move along a scale 103 thereon. The bar 102 is pivoted at its one end to the block 72 and at its other end to a block 104 which is mounted to slide freely along a horizontal guideway 105 provided in the adjusting slide 75.

By turning the screw 90 by means of the handle 91, the blocks 72 and 70 will be displaced vertically, thereby adjusting the length pantograph center 71 along the length pantograph lever 68 for the purpose of effecting a change of the length grading factor.

As is well-known by those skilled in the art, the position of the adjustable center of a pantograph lever with relation to the non-adjustable fulcrum thereof depends on two factors, namely the magnitude of certain lines of the model, usually termed "length and width lines", and the desired magnification or reduction of these lines. This magnification or reduction may be supposed to be the same for each successive size of pattern and is termed the grade. In the illustrated pantograph mechanism the distance of the adjustable center of the pantograph lever from the non-adjustable fulcrum thereof may be generally indicated by the equation $X = knL/S$ where $k$=a constant, $n$=the magnitude of the magnification of reduction as related to successive sizes of patterns, $L$=the measured length of one or the other of the above said lines, and $S$=the grade per size. In the machine illustrated the graduation of the scale 103 of the bar 102 are assumed to be determined to indicate the relation $L/S$ for models of different sizes. The relation $L/S$ may be determined by measuring the model with the aid of special scales the graduations of which are related to the desired grade. However, it may also be calculated mathematically or graphically.

Before effecting a length grading operation by the mechanism illustrated, the slide 101 is adjusted along the bar 102 to the graduation which corresponds to the factor $$\frac{L}{S}$$

In the turning of the screw 90 above mentioned, to effect an adjustment of the length pantograph center 71, the block 72 will cause the bar 102 to swing about its connection with the sliding block 104, and due to this swinging movement the slide 97 will be caused to move up or down, as the case may be, thereby causing the screw 96 to rotate in the opposite direction to the screw 90, and this rotation will cause, by the gears 95, 94, a rotation of the indicating disc 93 in the same sense to that of the screw 90, as that in moving the handle 91 from a hole to another of the indicating disc 93 a new set position will result, which corresponds to the distance $x$ of the equation stated above. The relative movement between the handle 91 and the indicating disc 93 represents a factor $n$ of the equation. If desired, there may be additional holes formed in the disc 93 between those shown to indicate half numbers or the like.

In effecting the length grading operation, as will be hereinafter more fully explained, the adjustable center 71 of the length grading lever 68 must be held stationary to enable the lever to effect a displacement of the length slide as a result of its swinging movement. To this end means are provided to lock the adjusting slide 75 against movement along the rib 36 of the north and south arm of the bracket 29. These means are shown in detail in Figs. 8 and 9. In this figures, 35a denotes a rib upstanding from the arm 35 of the length slide 32 and extending parallel to the rib 36 at the side thereof opposite to the slide 75. The members 35a and 75 are provided, on their upper faces, with flanges 80 and 81, respectively, in the shape of bars overlapping the upper face of the stationary rib 36 to some extent. Secured to the upper face of the rib 36, in the space between the flanges 80 and 81, is a bushing 82 carrying a horizontal shaft 83 which is mounted to rotate therein. The shaft 83 carries at its one end a worm 84 and at its other end a handle 85. The worm 84 is in mesh with a segment 86 of a screw wheel gear and this segment is mounted to slide transversely to the rib 36 in a guideway formed by two curved surfaces 82a and b of the bushing 82. The segment 86 is formed with projections 87, 88 at its opposite sides overlying the flanges 80 and 81, respectively, without normally touching same. By rotation of the worm 84 by turning the handle 85, the segment 86 may be operated to cause the projection 87 to clamp the flange 80 against the rib 36 or to cause the projection 88 to clamp the flange 81 against the rib 36 accordingly as the handle is turned in the one direction or the other. It is thus seen that by this device either the adjusting slide 75 or the length slide may be locked to the stationary frame. Normally, that is, in effecting a regular length grading operation, the adjusting slide 75 is thus locked. The length grading is now performed, principally, as follows, reference being had also to Fig. 15 which illustrates the pattern grading machine in a diagrammatic manner. By moving the guide pin 24 lengthwise of the model attached to the model holder 28, that is, in the north and south direction, as indicated at $a$ in Fig. 15, the link 48 is caused to swing about the axis of the shafts 60, 61. In doing this, the link 48, by means of the strap 54 and the fork 59, will cause the shafts 60, 61 to rotate by a corresponding amount. With the adjusting slide 75 locked to the rib 36 that is, to the machine frame, as above described, the length pantograph lever 68 is caused to swing about the now stationary center 71. For the sake of clearness, this center is shown in Fig. 15 as a pivot connecting the lever 68 to a link 175 connected at its other end to the adjusting slide 75. This swinging movement of the lever 68 will cause a displacement of the shafts 60, 61 and thus also of the length slide 32 in the north or south direction. If the pantograph center 71 is below the shafts 60, 61, as shown in Fig. 15, the length slide 32 will move in the same direction as the guide pin 24; if the pantograph center is above said shafts, the length slide 32 will move in the opposite direction to that in which the guide pin is moved, and if the pantograph center 71 is in a position to coincide with the axis of the shafts 60, 61, no movement at all will be imparted to the length slide as a result of a north or south movement of the guide pin. The extension of the movement of the length slide with respect to that of the guide pin 24, depends on the position of the pantograph center 71 on the lever 68 with respect to the axis of the shafts 60, 61. Since the width slide 37 supporting the model carrier 28 is constrained to partake of all movements of the length slide 32, it is clear, that the model carrier 28 will be caused to move in the same sense and by an equal amount as the length slide, thereby causing the model to move either in the same direction as the guide pin or in the reverse direction, according as the center 71 is situated below or above the axis of the shafts 60, 61. As the pattern board carrier 16 always moves with the guide pin, there will be produced, in the first-mentioned case a pattern of greater length than that of the model and in the latter case a pattern of reduced length. When the length pantograph center 71 is situated in alinement with the shafts 60, 61, the model carrier 28 will not perform any movement at all in the length direction with respect to the guide pin; in this case the length of the pattern will be equal to that of the model, i. e., a length grading at a 1:1 ratio will be obtained.

With the adjusting slide 75 released and the length slide 32 locked against movement, the position of the length pantograph center 71 may be adjusted without causing any swinging movement of the lever 68, that is, without causing any relative movement between the primary instrumentalities, viz. the model follower and the model holder, interconnected by the length pantograph. If a length grading is effected while the adjusting slide 75 is in its released state and the length slide is locked, the model carrier 28 will be held against movement in a north and south direction and the mechanism will grade at a 1:1 ratio, as far as length grading is concerned.

The width pantograph mechanism is, principally, similar to the length pantograph mechanism above described. Thus, it comprises, in combination, the link 48, a width pantograph lever having an adjustable center, and a shaft construction by which the link and the lever are interconnected so as to swing in unison thereabout. The axis of this shaft construction extends perpendicularly to the shafts 60, 61 of the length grading mechanism, that is, in a north and south direction. The width pantograph further includes an adjusting device for the adjustable center of the width pantograph lever. This device is exactly like that shown in Figs. 6–7 and need not be separately shown.

The shaft structure connecting the link 48 to the width pantograph lever is mounted in the width slide and has its axis coinciding with that of the pivot 58 above described. It includes two pins 112, 113, one on either side of the fork 59 of the shaft of the length pantograph. The pins 112, 113 are rotatably mounted in arms 114, 115 of the width slide 37 and are rigidly connected to opposite arms of a fork 111, the stem of which forms a bearing for a pivot pin 110 rigidly secured to the strap 54 of the link 48. The fork 111 encloses the fork 59 with a sufficient clearance to prevent them from touching each other when in operation. The pin 113 projects beyond the front (or south) face of the width slide 37 and carries there a radial arm 116, Fig. 3, which in this description is termed the "width pantograph lever". This lever is equal in construction to the length pantograph lever 68 above described. Thus, the width pantograph lever 116 has a longitudinal guideway similar to the guideway 69 of lever 68 and, likewise, a block is mounted to slide along this guideway and carries a pin, representing the adjustable center of the width pantograph lever, by which it is pivoted to another block 117, Fig. 1, slidably mounted in a frame 118, Fig. 1, which forms part of an adjusting slide 119 similar to the slide 75 already described. Thus, the frame 118 is provided with means exactly like those of the frame 74 for adjusting the position of the block 117. The slide 119 and its frame 118 are shown in their general arrangement in Fig. 1. In this figure, the controlling screw for operating the block 117 is indicated by 120, the handle of this screw by 121, and the indicator disc below said handle by 122, see also Fig. 5. 123 is the second screw, 124 is the slide corresponding to slide 97 of frame 74, and 125 is the scale bar corresponding to bar 102 of slide 75. The slide 119 is adjustable along the outer side of a rib 126 upstanding from the length slide 32 at the front (south) face thereof. Means are provided to permit locking of the adjusting slide 119 to the rib 126 and said means are exactly like those of the slide 74 which are illustrated in Figs. 8 and 9. The adjusting slide 119 has a top flange 130 overlapping to some extent the rib 126, and the width slide 37 has a corresponding flange 131 partially overlapping the rib 126 at the inner edge thereof, as shown in Fig. 5. In Fig. 5, 132 indicates the handle of the control shaft corresponding to the shaft 83 shown in Fig. 8, by the turning of which either the adjusting slide 119 or the width slide 37 may be locked to the rib 126, that is to say, locked against east and west movement with relation to the length slide 32.

The principle of operation of the width grading mechanism is similar to that of the length grading mechanism.

When the guide pin 24 is moved in the width direction, that is, in an east and west direction, as indicated by the arrow b in Fig. 15, or performs a movement having a component of movement in said direction, the link 48 will be caused to swing about the axis of the pins 112 and 113 by a corresponding amount. This will cause, by the fork 111 and the pivot pin 113, a corresponding swinging movement of the width pantograph lever 116. Let it be assumed that the associated adjusting slide 119 is locked to the length slide 32, which is the case in respect of regular grading, it will be seen that the lever 116 will perform its swinging motion about its adjustable center. This center is indicated by the reference numeral 150 in Fig. 15, and the position thereof is also indicated in Fig. 1 by the same reference numeral, though in Fig. 1 the reference numeral 150 actually indicates the pivot connecting the block 117 to link 125. For the sake of clearness, the adjustable width pantograph center 150 is shown in Fig. 15 as a connection between the lever 116 and a link 176 connected at its other end with the adjusting slide 119, whereas in the actual structure the center 150 may be considered to be arranged directly on the adjusting slide 119. As the adjusting slide 119 is assumed to be locked to the length slide 32, the center 150 cannot move with respect to said slide and, as a result, the swinging movement of the width pantograph lever 116 will effect a displacement of the width slide 37 with relation to the length slide 32 in an east and west direction. With the center 150 situated below the pivot 113, as shown in Fig. 15, the movement of the width slide 37 will take place in the same direction as the movement of the guide pin. When the center 150 is situated above the pivot pin 113, the width slide 37 will be moved in the reverse direction to the movement of the guide pin, and when the center 150 is situated in alinement with the pin 113, no movement at all will be imparted to the width slide by the width pantograph. Accordingly, the model carrier 28 will either be caused to move with relation to the guide pin in the same direction as the guide pin is moved, in order to magnify the width of the model in the pattern, or in the reverse direction to reduce the width of the model in the pattern, or finally, will not be moved at all with respect to the model follower in the width direction, thereby making the width of the pattern equal to that of the model.

The length and width grading operations above described apply to the regular grading, in which each outline of the model will be pantographically magnified or reduced accordingly as it is desired to produce a series of successively larger sizes of pattern or a series of successively smaller sizes of patterns from a model. The operation of the pantographs is such as to effect a uniform magnification or reduction of all parts of the model. In practice, however, there are many types of models which present a portion along its edge, which should remain constant in all sizes of pattern, that is to say, which should not be pantographically changed, as for a seam or lasting allowance or the like. Other portions to be maintained constant throughout the successive sizes are bars and tongues and other parts to which buckles should be applied or in which ornamental cut-outs should be made, and so on. For the purpose of dealing with this problem, the present invention provides novel means which are termed the "correction mechanism" in this description. This mechanism is situated at the left hand (west) end of the guide pin carrier 23 and is illustrated in Figs. 10–13 of the drawings.

For carrying the correction mechanism, the said end of the arm 23 is enlarged so as to form a rounded end piece 200. This rounded end piece has a vertical boring 201 formed with a shoulder at 202 and a body 203 is rotatably mounted in this boring so as to rest on the shoulder 202. The body 203 is connected at its top, by a number of screws 204, with a hand wheel 205. A vertical bolt 206 extends rotatably through a central boring in the body 203 and this bolt is formed at its lower end as a pinion 207 which is in mesh with the teeth of a rack 208 which is situated below the body 203 and extends in the direction of a diameter of the body 203. The rack 208 is mounted to slide in a guideway formed by two pieces 209 secured to the lower face of the body 203. By this means the rack 208 is caused to partake of the rotations of the body 203 but may slide radially with relation thereto. To the outer end of the rack 208 the universal joint 51 carrying the link 48 is connected by a screw 210.

The central bolt 206 is provided with screw-threads 211 engaging in an internally threaded sleeve 212 mounted to slide vertically in a boring formed in the body 203. The sleeve 212 is provided with a number of arms 213 (as three) extending radially from the lower end of the sleeve. The body 203 is formed with corresponding recesses 214 to allow the arms 213 to move up and down with the sleeve.

The central bolt 206 has an unthreaded portion 215 above the screw threads 211, and this unthreaded upper portion 215 engages rotatably in a central boring in a handle 216 which is rotatably and, to a certain extent, slidably mounted in a boring of the hand-wheel 205 and projects above the upper face thereof. The handle 216 carries a transverse pin 217 engaging a diametric slot 218 formed in the upper end of the bolt portion 215. At its lower end the stem of the handle 216 is formed with a conically widening surface, engaging a corresponding internal surface of the hand-wheel 205, as shown at 219, Fig. 10, to serve as a coupling between the handle 216 and the hand-wheel 205.

Beneath the stem of the handle 216 is situated a disc 220 having a number of radial arms 221 (as three), Fig. 13, the outer ends of which are cut so as to form parts of a downwardly tapering conical surface, as shown at 222, Fig. 10. In the spaces between the arms 221 upwardly extending projections 223 of the body 203 are situated to receive the screws 204 above referred to. These projections 223 effect a non-rotatably interconnection between the disc 220 and the body 203. A spring 224 situated in a recess formed in the body 203 acts a force the disc 220 upwardly, thereby causing it to keep the conical surface of the handle 216 in engagement with the conical surface of the hand wheel 205 at 219 in order to effect a coupling of the handle and the hand wheel to each other. The disc 220 is surrounded by a ring 225 having a conical boring to be engager by the conically cut ends of the arms 221 of disc 220. When the handle 216 and the hand wheel 205 are coupled together at 219, a small clearance exists between the ring 225 and the arms 221 of disc 220 to enable rotation of the disc 220 with relation to the ring 225 which is held stationary with respect to the arm 23 both as far as vertical displacement and rotation are concerned. A vertical displacement of the ring 225 is prevented due to the clamping of the ring between the body 203 and the hand-wheel 205, and a rotation of the ring 225 is made impossible by the provision of projections 226 upstanding from a non-rotary sleeve 227 which engage corresponding recesses formed in the ring 225, as will be evident from Fig. 13. The locking of the sleeve 227 against rotation is effected by a key 228 situated in the end piece 200 of the arm 23 and engaging with its inner end in a vertical slot 229 formed in the sleeve 227. Owing to the provision of said slot, the key permits vertical sliding movements of the sleeve 227.

The sleeve 227 is provided with an inwardly extending flange 230 supported by the radial arms 213 of the sleeve 212 and a spring 231 is supported by this flange and abuts at its upper end against the lower face of ring 225. The sleeve 227 is formed at a portion of its periphery with a set of oblique teeth 232 in mesh with a pinion 233 for rotating same as a result of a vertical displacement of the sleeve 227. The pinion 233 carries a pointer 234 reading along an arcuate scale 235 on a plate 236 covering the upper face of the head 200 of arm 23. Te key 228 above described may, preferably, be formed integrally with this plate 236. Above the pointer 234 is placed a protecting shield 237 which only exposes the outermost end of the pointer and the scale, as shown in Fig. 13. The protecting shield 237 is formed integrally with an upstanding cylindrical wall 238 which surrounds the sleeve 227 and on the top of which the head-wheel 205 rests with a depending circumferential flange, as shown in Fig. 10.

Normally, the handle 216 is locked to the hand wheel 205 by the engagement between said members at 219. When a correction (restriction) is to take place, the handle 216 is then pressed downwards against the action of spring 224 so as to release the engagement at 219, thereby allowing the handle to be rotated with relation to the hand wheel. At the same time, the hand wheel 205 is locked against rotation because the disc 220 which is nonrotatably mounted in the hand wheel is pressed against the stationary ring 225 and coupled thereto at 222. By turning the handle 216 the rack 208 may be displaced to a position in which the radial distance between the centre of the bolt 206 and the centre of the universal joint 51 corresponds to the magnitude of the correction desired. In the machine illustrated the said distance is equal to the width of the portion to be maintained constant in the grading of a series of patterns from the same model. The magnitude of the displacement, that is, the width of the said portion, may be directly read off on the arcuate scale 235, inasmuch as a rotation of the handle 216 to effect a displacement of the universal joint 51 away from the centre of bolt 206 causes an upward movement of the sleeve 212 which in its turn lifts the sleeve 227 correspondingly, thereby causing the oblique teeth 232 of sleeve 227 to turn the pinion 233 with the pointer 234 to a position directly indicating the magnitude of said displacement. After the magnitude of the correction has been determined in this way, the operator may remove his hand from the handle 216. When thus released, the handle will now again be coupled to the hand wheel 205 under the influence of the spring 224. At the same time the engagement at 222 between the disc 220 and the ring 225 will be released, thereby releasing the hand wheel 205 so that it can be rotated in the end piece 200 of the guide pin arm 23. By turning the hand wheel 205, the operator can now determine on which side of the model the correction is to take place. Due to the engagement between the hand wheel 205 and the handle 216, they will partake of the rotation of the hand wheel so that all elements of the correcting mechanism will remain in their relative position during the rotation of the handle. If the correction is to be effected, for instance, on the east side of the model, then the hand wheel should be so turned that the universal joint will be positioned on the east side of the centre of the bolt 206; if the correction is to take place on the north side of the model, then the universal joint should be on the south side of the centre of bolt 206 and so on.

If an exact correction is to be effected along a curved edge of the pattern it is thus evident that the correcting mechanism must be adjusted during the whole grading operation so as to satisfy said condition. In effecting a correction along a more or less straight-lined edge the adjustment may be effected along the resultant of the desired correction in length and width, that is, along a line which is oblique to both the length and width. The said last-mentioned adjustment may be effected very readily with the aid of the correcting mechanism described, and so can the turning of the correcting mechanism in effecting a correction along a curved edge due to the combining of the correction devices for length and width in a common mechanism.

From a manufacturing point of view it is sometimes desirable to maintain certain edges of a model unchanged through the entire series of patterns to be cut or through part thereof. To this end the grading factor must be changed at a certain point, generally termed the "centre point", either to a 1:1 ratio or to some other predetermined ratio. The conditions to be satisfied by a pattern grading machine, as far as centre grading is concerned, involve not only that the pantographs should be so constructed as to allow changes of the grading factor but also that said changes shall not interfere with the grading results. In other words, after the guide pin is placed above the centre point, the adjustments of the pantographs shall not cause any change of the relative position of the guide pin and the punching device with relation to each other. According to a well-known principle of centre grading, the centre point of the model holder is selected as the centre point of grading. If the guide pin is placed above said point, the two pantograph levers will assume a vertical position so that their extension will coincide with that of the respective adjusting slides. Thus it is possible, in this case, to effect adjustments of the pantographs without changing the grading factor.

In certain cases, however, it may happen that one and the same model has more than one centre point and in other cases there may be more than one model placed upon the model holder so that two or more centre points will result. In order that the above said conditions shall be satisfied in respect of each centre point, a more complicated adjustment is necessary. In the machine illustrated, said adjustment is effected as follows:

The guide pin 24 is placed above the respective centre point, whereupon the carriage 12 and the pattern board carrier are locked against movement and then the locking devices of the pantograph adjusting slides are operated by turning their handles 85 and 132, respectively, in a direction to release the adjusting slides and lock the length grading slide to the frame of the machine and the width grading slide to the length grading slide, in a manner previously described in connection with the description of the adjustment of the pantographs for changing the grading factor. The pantographs may now be adjusted to the desired grade and after this is completed, the locking devices are shifted so as to lock the adjusting slides against movement while releasing the length and width grading slides. The grading can now be continued according to the new grading factor. These operations must of course be repeated in respect of each separate centre point.

In effecting a change of the grading factor from any given value to a 1:1 ratio in case of several centre points, the complicated procedure just described is not necessary, and in this case the operator need only effect a shifting of the locking devices so as to release the adjusting slides of the pantographs and lock the grading slides proper. Thus, in the continued grading operation the model holder is held stationary, whereas the pantograph adjusting slides may move freely. In this case the pantographs are inoperative so that the machine acts as a mere copying machine.

The means for effecting the locking of the carriage 12 and the model pattern board carrier 16 above referred to, may be of any appropriate construction. In Fig. 14, a form of such a device is illustrated by way of example. A bar 160 is mounted to slide to a little extent in the north and south direction along the pattern board carrier 16 and perform a slight vertical movement at the same time. To this end the bar 160 is guided by pins 161 engaging in oblique slots 162 formed in the bar 160. The bar carries a depending pin 163 to engage the upper surface of the south guideway 11, when the bar is displaced north. The displacement of the bar 160 is controlled by a finger lever 164 pivoted to the carrier 16 at the south end thereof by the pin 165 and also pivoted to the bar 16 by the pin 166 engaging a vertical slot in the bar so as to effect a displacement thereof by the turning of the lever 164.

What I claim is:

1. In a pattern grading machine, four primary elements, namely, a model holder, a work holder, a model follower and a cutting tool, one of said elements occupying a stationary location in the machine, two other of said elements being mounted to move together in two grading directions, the remaining element being mounted to move in the same grading directions, two pantographs to effect movement of said last-mentioned element with relation to the said two other elements, and a member common to both of the pantographs to transmit motion from said two other elements to the pantographs to move each of them independently.

2. In a pattern grading machine, four primary elements, namely, a model holder, a work holder, a model follower and a cutting tool, a carrier movable in two grading directions to support two of said elements as a unit, means including two grading slides movable in the grading directions for carrying a third one of said primary elements, two pantographs associated with said grading slides, and a member common to both pantographs to transmit motion from said carrier to said pantographs to cause them to move the said third element with relation to the said two elements to reproduce a model in a work piece.

3. In a pattern grading machine, four primary elements, namely, a model holder, a work holder, a model follower and a cutting tool, pantograph mechanism interconnecting said elements to cause them to move relatively to reproduce a model in a work piece, a carrier movable in two perpendicular directions for supporting two of said elements to move them as a unit, two crossed slides to support a third one of said primary elements for moving it in said perpendicular directions, said pantograph mechanism including two pantographs each associated with its respective crossed slide, and a member common to both pantographs to connect them to said carrier in order upon a movement of the carrier to cause the pantographs to move the crossed slides together in one direction and to move one of them independently in the other direction.

4. In a pattern grading machine, four primary elements, namely, a model holder, a work holder, a model follower and a cutting tool, one of said elements occupying a fixed location in the machine, two of the remaining elements being connected to move together in two grading directions, and the other remaining element being mounted to move in the grading directions with relation to said two remaining elements, a carrier movable in the grading directions to support said two remaining elements, a pair of grading slides to carry the said other remaining element, two pantographs associated with said grading slides, a member connected directly to a point of the said carrier to impart the movement thereof to the grading slides to cause them to move in their respective directions with relation to the carrier and the elements supported thereby to reproduce a model in a work piece.

5. In a pattern grading machine, four primary elements, namely, a model holder, a work holder, a model follower and a cutting tool, a common carrier for two of said elements to move them in common in two grading directions, a pair of crossed slides movable together in one grading direction and one of them movable with respect to the other in the other grading direction, a link connected to a point of said common carrier to transmit motion thereof to the pantographs, and means to divide the motion of said link into independent movements of the pantographs.

6. In a pattern grading machine, four primary elements, namely, a model holder, a work holder, a model follower and a cutting tool, a carrier movable in two grading directions to support two of said elements as a unit, a pantograph mechanism interconnecting the elements to cause them to move relatively to reproduce a model in a work piece, said mechanism comprising a link, a universal joint connecting one end of said link to a point of said carrier, means connected to the other end of the link to divide the movement thereof about the universal joint into two independent rotary movements about two perpendicular axes, and means to convert said rotary movements into two translatory movements in the grading directions with relation to said carrier.

7. In a pattern grading machine, four primary elements, namely, a model holder, a work holder, a model follower and a cutting tool, a carrier movable in two grading directions to support two of said elements as a unit, two crossed slides movable together in one grading direction and one of them movable with respect to the other in the other grading direction and carrying one of the remaining primary elements, pantograph mechanism including a link, a universal joint connecting one end of said link to an adjustable point of said carrier, means including two pantograph levers to divide the movement of said link about said universal joint into two independent swinging movements of the pantograph levers, and means to convert said swinging movements into translatory movements of said crossed slides in their respective directions to cause the element carried thereby to move with relation to the elements supported by said carrier for reproducing a model in a work piece.

8. In a pattern grading machine, four primary elements, namely, a model holder, a work holder, a model follower and a cutting tool, a common carrier for two of said elements movable in two perpendicular grading directions, a link, a universal joint connecting said link to a point of said carrier, means to adjust said point radially with respect to a given centre, means to adjust said point angularly about said centre, a pair of crossed slides to carry one of the remaining primary elements, and means to divide the motion of said link about said adjustable point into independent movements of said slides.

9. In a pattern grading machine, four primary elements, namely, a model holder, a work holder, a model follower and a cutting tool, a common carrier for two of said elements movable in two perpendicular grading directions, a link, a universal joint connecting said link to an adjustable point of said carrier, a pair of crossed slides movable together in a certain direction and one of them movable independently in a perpendicular direction and carrying one of the remaining two primary elements, a shaft rotatably mounted in each of said slides, means to divide the movement of the link about the universal joint into independent rotations of said shafts, and means including a pantograph lever on each shaft to convert the rotary movement of each shaft into a translatory movement of the respective slide.

10. In a pattern grading machine, four primary elements, namely, a model holder, a work holder, a model follower and a cutting tool, a common carrier for two of said elements movable in two perpendicular grading directions, a link, a universal joint connecting said link to an adjustable point of said carrier, a pair of crossed slides movable together in a certain direction and one of them movable independently in a perpendicular direction and carrying one of the remaining two primary elements, a shaft rotatably mounted in each of said slides, means to divide the movement of the link about the universal joint into independent rotation of said shafts, and means including a pantograph lever on each shaft and an associated setting slide to convert the rotary movement of each shaft into a translatory movement of the respective slide.

11. In a pattern grading machine, four primary elements, namely, a model holder, a work holder, a model follower and a cutting tool, a common carrier for two of said elements movable in two perpendicular grading directions, a link, a universal joint connecting said link to an adjustable point of said carrier, a pair of crossed slides movable together in a certain direction and one of them movable independently in a perpendicular direction and carrying one of the remaining two primary elements, a shaft rotatably mounted in each of said slides, means to divide the movement of the link about the universal joint into independent rotations of said shafts, a lever rigidly secured to each shaft, said lever having an adjustable fulcrum, and means including a slide and mechanism carried thereby to effect the adjustment of said fulcrum.

12. In a pattern grading machine, four primary elements, namely, a model holder, a work holder, a model follower and a cutting tool, a common carrier for two of said elements movable in two perpendicular grading directions, a link, a universal joint connecting said link to an adjustable point of said carrier, a pair of crossed slides movable together in a certain direction and one of them movable independently in a perpendicular direction and carrying one of the remaining two primary elements, a shaft rotatably mounted in each of said slides, means to divide the movement of the link about the universal joint into independent rotations of said shafts, a lever rigidly secured to each shaft, said lever having an adjustable fulcrum, means including a slide and mechanism carried thereby to effect the adjustment of said fulcrum, and means to release said adjusting slide and lock the respective crossed slide to render the grading mechanism inoperative.

13. In a pattern grading machine, four primary elements, namely, a model holder, a work holder, a model follower and a cutting tool, a common carrier for two of said elements movable in two perpendicular grading directions, a link, a universal joint connecting said link to an adjustable point of said carrier, a pair of crossed grading slides movable together in a certain direction and one of them movable independently in a perpendicular direction and carrying one of the remaining two primary elements, a shaft rotatably mounted in each of said grading slides, means to divide the movement of the link about the universal joint into independent rotations of said shafts, a lever rigidly secured to each shaft, said lever having an adjustable fulcrum, means including a slide and mechanism carried thereby to effect the adjustment of said fulcrum, means to alternately release said adjusting slide and lock the respective grading slide and vice versa, and means to lock said carrier against movement to allow changing the grading factor without causing any relative movement of the primary elements.

14. In a pattern grading machine, four primary elements, namely, a model holder, a work holder, a model follower and a cutting tool, a common carrier for two of said elements movable in two perpendicular grading directions, a link, a universal joint connecting said link to an adjustable point of said carrier, a pair of crossed grading slides movable together in a certain direction and one of them movable independently in a perpendicular direction and carrying one of the remaining two primary elements, a shaft rotatably mounted in each of said slides, means to divide the movement of the link about the universal joint into independent rotations of said shafts, a lever rigidly secured to each shaft, said lever having an adjustable fulcrum, means including a slide and mechanism carried thereby to effect the adjustment of said fulcrum, said mechanism comprising means to determine the change of the position of the fulcrum for successive sizes of patterns with relation to a given model size, and means to effect said changes.

15. In a pattern grading machine, four primary elements, namely, a model holder, a work holder, a model follower and a cutting tool, two of said elements being connected to move together in two grading directions, one of the remaining elements being also movable in the grading directions and the other occupying a fixed location in the machine, a common carrier for said first-mentioned two elements and another carrier, including two crossed slides, for the remaining movable element, a correcting device carried by said carrier, comprising a body rotatably mounted in said carrier, a radially adjustable member carried by said body and means rotatably mounted in said body to adjust said member radially, a universal joint carried by said member, a link carried by said universal joint, and means connected to said link to divide its movement about said universal joint into independent movements of said crossed slides.

16. In a pattern grading machine, four primary elements, namely, a model holder, a work holder, a model follower and a cutting tool, two of said elements being connected to move together in two grading directions, one of the remaining elements being also movable in the grading directions and the other occupying a fixed location in the machine, a common carrier for said first-mentioned two elements and another carrier, including two crossed slides, for the remaining movable element, a correcting device carried by said carrier, comprising a body rotatably mounted in said carrier, a radially adjustable member carried by said body, means rotatably mounted in said body to adjust said member radially and means to visibly indicate the extent of the radial adjustment, a universal joint carried by said member, a link carried by said universal joint, and means connected to said link to divide its movement about said universal joint into independent movements of said crossed slides.

17. In a pattern grading machine, four primary elements, namely, a model holder, a work holder, a model follower and a cutting tool, two of said elements being connected to move together in two grading directions, one of the remaining elements being also movable in the grading directions and the other occupying a fixed location in the machine, a common carrier for said first-mentioned two elements and another carrier, incuding two crossed slides, for the remaining movable element, a correcting device carried by said carrier, comprising a hand-wheel rotatably mounted in said carrier, a radially adjustable member carried by said hand-wheel, a handle rotatably mounted in said hand-wheel to adjust said member radially, means to lock the hand-wheel against rotation upon the operation of the handle and to lock the handle against rotation relatively to the hand-wheel upon rotation of the latter, and means to visiby indicate the extent of said radial adjustment, a universal joint carried by said member, a link carried by said universal joint, and means connected to said link to divide its movement about said universal joint into independent movements of said crossed slides.

18. In a pattern grading machine, a cutting tool occupying a fixed location in the machine, a model follower and a work holder connected to move as a unit, a carrier movable in two grading directions to support said work holder and model follower, a model holder, a grading slide carrying said model holder, another grading slide supporting said first-mentioned grading slide so as to move therewith in a certain direction while allowing the first-mentioned grading slide to move independently in another grading direction, a shaft in each of said slides, a lever on each of said shafts, an adjustable fulcrum on each lever, means including a slide and mechanism carried thereby to effect the adjustment of said fulcrum, means to lock said adjusting slide against movement in the direction of movement of the respective grading slide, a link connected to an adjustable point of said carrier, means for effecting the adjustment of said point, means for connecting said link to said shafts to rotate them independently upon movement of the link about said point, means to lock the grading slides against movement in the released state of the respective adjusting slides, and means to lock the carrier against movement with relation to the machine.

19. In a pattern grading machine, four primary elements, namely, a model holder, a work holder, a model follower and a cutting tool, a common carrier for supporting two of said elements movable in two perpendicular grading directions, a pair of crossed slides to move another primary element in said directions relatively to said first-mentioned two elements, said slides being located on a lower level than said primary elements, a depending connection between said carrier and said slides, including a link, a universal joint at the upper end of said link connecting said link to an angularly adjustable point of the carrier, and means at the lower end of said link to divide the motion of said link about said adjustable point into independent movements of said slides to cause the said one of the remaining elements to move with relation to the elements supported by said carrier.

20. In a pattern grading machine, four primary elements, namely a model holder, a work holder, a model follower and a cutting tool, two of said elements being movable in common in two grading directions by manual operation, two pantographs connected to a third primary element movable in said two directions, a single connecting member movable in all directions to independently transmit the movements of said first-mentioned elements in either direction to the pantographs to cause said pantographs to effect independent movements of said third element in said two directions.

HILMER GUSTAF ADOLF AKERLIND.